United States Patent
Han

(10) Patent No.: US 11,314,357 B2
(45) Date of Patent: Apr. 26, 2022

(54) TOUCH SENSING DEVICE FOR FITTING DRAWING LINE AND TOUCH SENSING METHOD USING SAME

(71) Applicant: SILICON WORKS CO., LTD., Daejeon (KR)

(72) Inventor: Chan Hee Han, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/104,133

(22) Filed: Nov. 25, 2020

(65) Prior Publication Data

US 2021/0191597 A1    Jun. 24, 2021

(30) Foreign Application Priority Data

Dec. 19, 2019    (KR) ........................ 10-2019-0170841

(51) Int. Cl.

| | |
|---|---|
| G06F 3/041 | (2006.01) |
| G06T 11/20 | (2006.01) |
| G06F 3/044 | (2006.01) |
| G09G 3/36 | (2006.01) |
| G02F 1/1333 | (2006.01) |
| G02F 1/1368 | (2006.01) |

(52) U.S. Cl.
CPC ........ *G06F 3/04186* (2019.05); *G06T 11/203* (2013.01); *G02F 1/1368* (2013.01); *G02F 1/13338* (2013.01); *G02F 2201/121* (2013.01); *G06F 3/0446* (2019.05); *G09G 3/3677* (2013.01); *G09G 3/3688* (2013.01); *G09G 2310/08* (2013.01)

(58) Field of Classification Search
None
See application file for complete search history.

(56) References Cited

FOREIGN PATENT DOCUMENTS

| KR | 10-1992849 B1 | | 6/2019 |
|---|---|---|---|
| KR | 101992849 B1 | * | 6/2019 |
| KR | 10-2063347 B1 | | 1/2020 |
| KR | 102063347 B1 | * | 1/2020 |

* cited by examiner

*Primary Examiner* — Kirk W Hermann
(74) *Attorney, Agent, or Firm* — Harness, Dickey & Pierce, P.L.C.

(57) ABSTRACT

A touch sensing device includes a touch coordinate calculation unit configured to calculate touch coordinates for touch inputs that occurred on a touch screen panel, a reference coordinate setting unit configured to set one reference coordinate for each predetermined sample section on the basis of positions at which the touch coordinates are generated, and a touch coordinate correction unit configured to generate touch output-coordinates for the touch coordinates by smoothing each of touch coordinates positioned in a corresponding sample section on the basis of the reference coordinate set for the corresponding sample section.

12 Claims, 10 Drawing Sheets

FIG. 8

TOUCH SENSING DEVICE FOR FITTING DRAWING LINE AND TOUCH SENSING METHOD USING SAME

CROSS-REFERENCE TO RELATED APPLICATIONS

This application claims the benefit of the Korean Patent Application No. 10-2019-0170841 filed on Dec. 19, 2019 which is hereby incorporated by reference as if fully set forth herein.

FIELD

The present specification relates to a touch sensing device, and more particularly, to a touch sensing device capable of correcting the distortion of a touch-drawing line.

BACKGROUND

With development into an information society, various demands are increasing for display devices for displaying images. Recently, various types of display devices such as a liquid crystal display (LCD) device or an organic light-emitting diode (OLED) display device are being utilized.

In recent years, display devices having a touch screen panel capable of detecting a touch input by a user's finger, a stylus pen, or the like have been widely used to break away from conventional input methods using buttons, a keyboard, a mouse, and the like. The display device having such a touch screen panel includes a touch sensing device for accurately detecting the presence or absence of a touch and a touch coordinate (a touch position).

When a user performs a line drawing on the touch screen panel through a touch input, distortion may occur in the drawing line due to interference caused by noise or the like. In order to solve such a problem, methods of correcting touch coordinates using a point smoothing algorithm have been proposed. The smoothing algorithm reduces the influence of noise in the touch coordinates so that the drawing line drawn by the touch input may be smoothly expressed.

For example, in a case in which a smoothing algorithm is not applied to touch coordinates, a user's touch-drawing line is displayed to be meandering without smoothness as illustrated in FIG. 1A. In contrast, in a case in which the smoothing algorithm is applied to the touch coordinates, noise is reduced and thus the user's touch-drawing line is expressed as a smooth and natural line as illustrated in FIG. 1B.

The above-described smoothing algorithm corrects a current touch coordinate by assigning a weight to each of a past touch coordinate and the current touch coordinate. In this case, as the higher weight is set in the past touch coordinate, that is, as the smoothing becomes stronger, the smoothness of the touch-drawing line is improved, but there is a problem in that distortion in a curved portion becomes severe.

In contrast, as the higher weight is set in the current touch coordinate, that is, as the smoothing becomes weaker, the distortion in the curved portion is reduced, but there is a problem in that the smoothness of the touch-drawing line is reduced.

SUMMARY

The present disclosure is directed to providing a touch sensing device and a touch sensing method for fitting a drawing line that are capable of improving the smoothness of a touch-drawing line and simultaneously reducing the distortion of the touch-drawing line.

According to an aspect of the present disclosure, there is provided a touch sensing device for fitting a drawing line including a touch coordinate calculation unit configured to calculate touch coordinates for touch inputs occurred on a touch screen panel, a reference coordinate setting unit configured to set one reference coordinate for each predetermined sample section on the basis of positions at which the touch coordinates are generated, and a touch coordinate correction unit configured to generate touch output-coordinates for the touch coordinates by smoothing each of the touch coordinates positioned in a corresponding sample section on the basis of the reference coordinate set for the corresponding sample section.

According to another aspect of the present disclosure, there is provided a touch sensing method for fitting a drawing line including setting a touch coordinate positioned at a first point on a touch screen panel as a first reference coordinate, and smoothing each of first touch coordinates, which are positioned in a first sample section that starts from the first reference coordinate on the touch screen panel, on the basis of the first reference coordinate to generate first touch output-coordinates for the first touch coordinates.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 8A, 8B and 8C are a set of views illustrating a comparison between a result of strictly applying the smoothing algorithm to the touch-drawing line in a numeric shape, a result of weakly applying the smoothing algorithm to the touch-drawing line, and a result of applying the algorithm according to the present disclosure to the touch-drawing line.

DETAILED DESCRIPTION

Figure 1A:
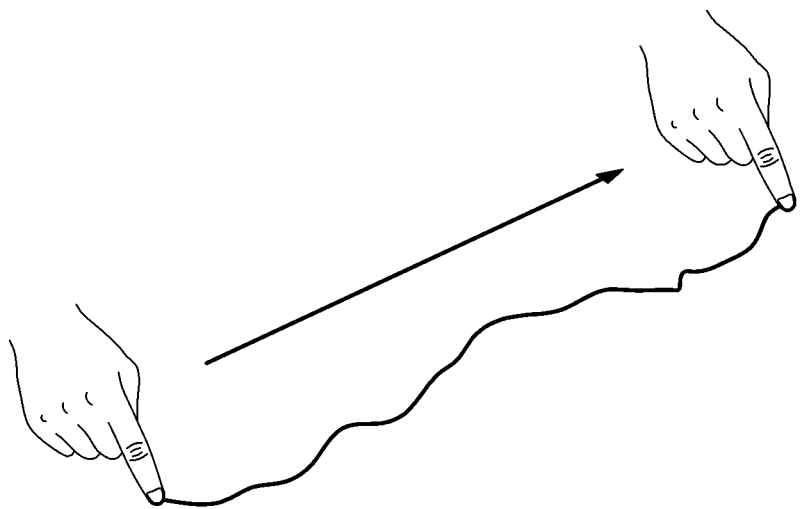
FIG. 1A is a view illustrating a drawing line composed of touch coordinates to which a smoothing technique is not applied.
Figure 1B:
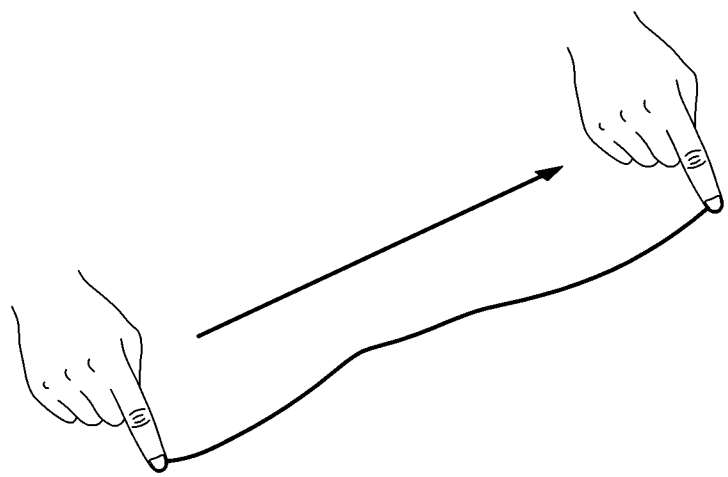
FIG. 1B is a view illustrating a drawing line composed of touch coordinates that are corrected using the smoothing technique.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present specification will be described in detail with reference to the accompanying drawings.

Figure 2:
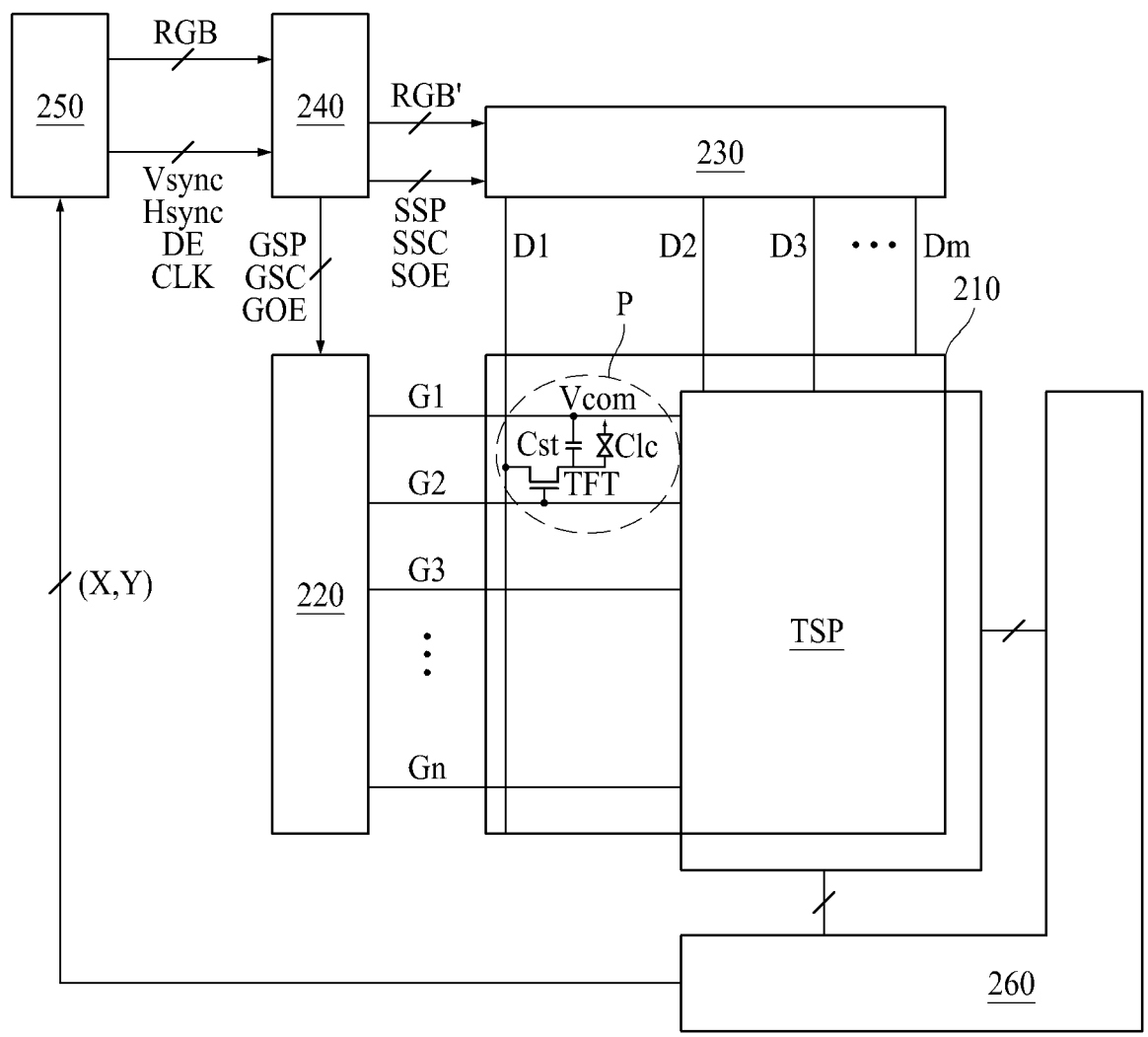
FIG. 2 is a diagram illustrating a display system to which a touch sensing device according to one embodiment of the present disclosure is applied.

FIG. 2 is a diagram illustrating a display system to which a touch sensing device according to one embodiment of the present disclosure is applied.

As illustrated in FIG. 2, a display system 200 includes a display panel 210, a gate driver 220, a data driver 230, a timing controller 240, a host system 250, a touch screen panel TSP, and a touch sensing device 260.

The display panel 210 includes a plurality of gate lines G1 to Gn and a plurality of data lines D1 to Dm, which are arranged to intersect each other and define a plurality of pixel regions, and a pixel P provided in each of the plurality of pixel regions. The plurality of gate lines G1 to Gn may be extended in a transverse direction and the plurality of data lines D1 to Dm may be extended in a longitudinal direction, but the present disclosure is not necessarily limited thereto.

In one embodiment, the display panel 210 may be a liquid crystal display (LCD) panel. When the display panel 210 is an LCD panel, the display panel 210 includes thin-film transistors (TFTs) and liquid crystal cells connected to the TFTs, which are formed in the pixel regions defined by the plurality of gate lines G1 to Gn and the plurality of data lines D1 to Dm.

The TFT transmits a source signal supplied through the data lines D1 to Dm to the liquid crystal cell in response to a scan pulse supplied through the gate lines G1 to Gn.

The liquid crystal cell is composed of a common electrode and a sub-pixel electrode, which is connected to the TFT, facing each other with a liquid crystal therebetween and thus may be equivalently expressed as a liquid crystal capacitor Clc. The liquid crystal cell includes a storage capacitor Cst connected to the gate line of a previous stage in order to maintain a voltage corresponding to the source signal charged in the liquid crystal capacitor Clc until a voltage corresponding to a next source signal is charged.

Meanwhile, the pixel regions of the display panel 210 may include red (R), green (G), blue (B), and white (W) subpixels. In one embodiment, each of the subpixels may be repeatedly formed in a row direction or formed in a matrix form of 2×2. In this case, a color filter corresponding to each color is disposed in each of the red (R), green (G), and blue (B) subpixels, but a separate color filter is not disposed in the white (W) subpixel. In one embodiment, the red (R), green (G), blue (B), and white (W) subpixels may be formed to have the same area ratio, but may also be formed to have different area ratios.

Although the display panel 210 has been described as being an LCD panel in the above-described embodiment, in other embodiments, the display panel 210 may also be an organic light-emitting display (OLED) panel.

The gate driver 220 includes a shift register configured to sequentially generate a scan pulse, that is, a gate high pulse, in response to a gate control signal GCS from the timing controller 240. In response to the scan pulse, the TFT is turned on.

The gate driver 220 may be disposed on one side of the display panel 210, for example, on a left side of the display panel 210 as illustrated in the drawing, but in some cases, may be disposed on one side and the other side of the display panel 210 which are opposite to each other, for example, both left and right sides thereof. The gate driver 220 may include a plurality of gate driver integrated circuits (ICs) (not shown). The gate driver 220 may be formed in the form of a tape carrier package on which the gate driver ICs are mounted, but the present disclosure is not necessarily limited thereto, and the gate driver ICs may be directly mounted on the display panel 210.

The data driver 230 converts a digital image signal RGB' transmitted from the timing controller 240 into an analog source signal and outputs the analog source signal to the display panel 210. In more detail, the data driver 230 outputs the analog source signal to the data lines D1 to Dm in response to a data control signal DCS transmitted from the timing controller 240.

The data driver 230 may be disposed on one side of the display panel 210, for example, on an upper side of the display panel 210, but in some cases, may be disposed on one side and the other side of the display panel 210 which are opposite to each other, for example, both upper and lower sides thereof. In addition, the data driver 230 may be formed in the form of a tape carrier package on which source driver ICs are mounted, but the present disclosure is not necessarily limited thereto.

In one embodiment, the data driver 230 may include a plurality of source driver ICs (not shown) configured to convert a digital image signal transmitted from the timing controller 240 into an analog source signal and output the analog source signal to the display panel 210.

The timing controller 240 receives various timing signals including a vertical synchronization signal Vsync, a horizontal synchronization signal Hsync, a data enable signal DE, a clock signal CLK, and the like from the host system 250 and generates the data control signal DCS for controlling the data driver 230 and the gate control signal GCS for controlling the gate driver 220. In addition, the timing controller 240 receives an image signal RGB from the host system 250, converts the received image signal RGB into the image signal RGB' in a form that can be processed by the data driver 230, and outputs the converted image signal RGB'.

In one embodiment, the data control signal DCS may include a source start pulse SSP, a source sampling clock SSC, a source output enable-signal SOE, and the like, and the gate control signal GCS may include a gate start pulse GSP, a gate shift clock GSC, a gate output enable signal GOE, and the like.

Here, the source start pulse controls a data sampling start timing of the plurality of source driver ICs which configure the data driver 230. The source sampling clock is a clock signal which controls a sampling timing of data in each of the source driver ICs. The source output enable-signal controls an output timing of each of the source driver ICs.

The gate start pulse controls an operation start timing of the plurality of gate driver ICs which configure the gate driver 220. The gate shift clock is a clock signal which is commonly input to one or more gate driver ICs and controls a shift timing of a scan signal (gate pulse). The gate output enable signal designates timing information of one or more gate driver ICs.

The host system 250 may be implemented as one among a navigation system, a set-top box, a digital video disk (DVD) player, a Blu-ray player, a personal computer (PC), a home theater system, a broadcast receiver, and a phone system. The host system 250 includes a system-on-chip (SoC) with a built-in scaler to convert the digital image signal RGB of an input image into a format suitable for display on the display panel 210. The host system 250 transmits the digital image signal RGB and the timing signals to the timing controller 240. In addition, the host system 250 analyzes touch output-coordinates X and Y input from the touch sensing device 260 and outputs the touch output-coordinate on the display panel 210 in a form of characters or lines or executes an application program associated with coordinates generated by a user's touch.

Figure 3A:
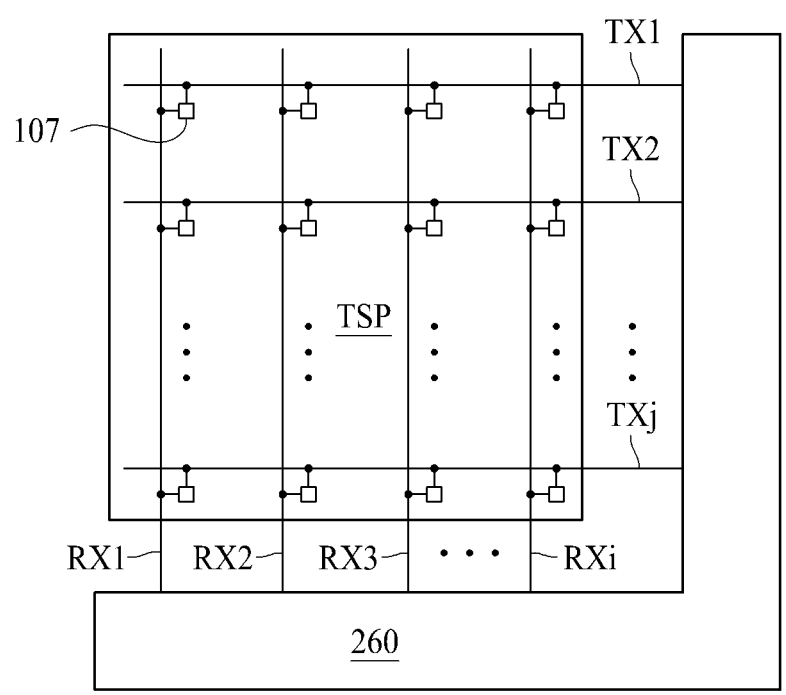
FIGS. 3A and 3B are schematic diagrams illustrating a configuration of a touch screen panel illustrated in FIG. 2.

The touch screen panel TSP is where the user's touch is input, and in one embodiment, as illustrated in FIG. 3A, the touch screen panel TSP may include touch driving lines TX1 to TXj (where, j is a natural number greater than or equal to 2) through which a touch driving signal is transmitted, a plurality of touch electrodes 107, and touch sensing lines RX1 to RXi (where, i is a natural number greater than or equal to 2) through which voltages (or charges) of the touch electrodes 107 are transmitted. In this case, each of the touch electrodes 107 includes a mutual capacitor. The touch sensing lines RX1 to RXi may refer to sensing lines of the touch screen panel TSP. In one embodiment, the touch screen panel TSP may be implemented in a form embedded in the display panel 210. For example, the touch screen panel TSP may be disposed on the display panel 210 in an on-cell manner or may be disposed in the display panel 210 an in-cell manner.

Figure 3B:
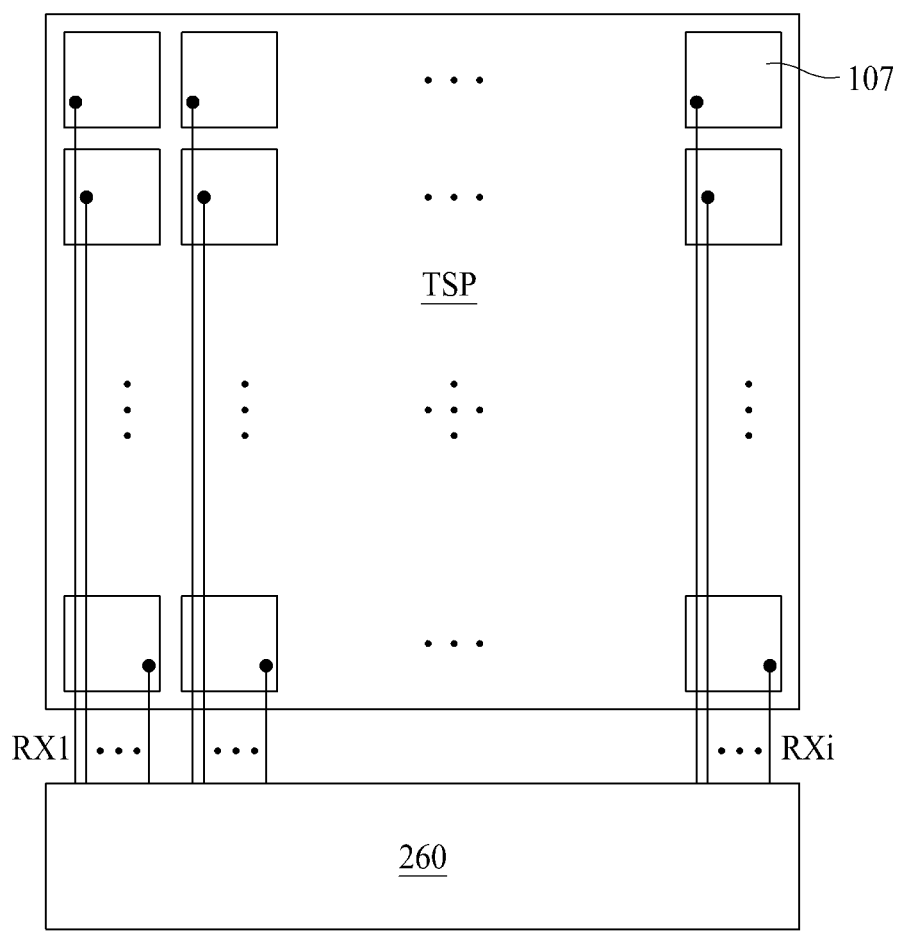

In FIG. 3A, the touch screen panel TSP is illustrated as being a mutual-capacitance-type touch screen panel including the touch driving lines TX1 to TXj and the touch sensing lines RX1 to RXi. However, the present disclosure is not limited thereto, and a self-capacitance-type touch screen panel may be applied as illustrated in FIG. 3B. In the self-capacitance-type touch screen panel, the supply of a touch driving signal and the reception of a change in capacitance caused by a user's touch or a touch by a stylus pen are implemented through one of the touch sensing lines RX1 to RXi.

Referring to FIG. 2 again, the touch sensing device 260 senses a touch generated on the touch screen panel TSP. In one embodiment, the touch sensing device 260 drives the touch electrodes 107 by supplying the touch driving signal to the touch electrodes 107 through the touch driving lines TX1 to TXj and senses a change in capacitance, which occurs when the touch electrodes 107 are touched, through the touch sensing lines RX1 to RXi.

The touch sensing device 260 calculates touch raw data TRD on the basis of the obtained capacitance change and calculates a touch coordinate on the basis of the calculated touch raw data.

In particular, the touch sensing device 260 according to the present disclosure may reduce the distortion of a touch-drawing line in a range in which a certain touch latency is satisfied when the touch is sensed and, simultaneously, may correct the touch coordinate to improve the smoothness of the touch-drawing line and transmit the corrected touch coordinate to the host system 250 as final touch output-coordinates X and Y.

Hereinafter, a configuration of the touch sensing device according to the present disclosure will be described in more detail with reference to FIG. 4.

Figure 4:
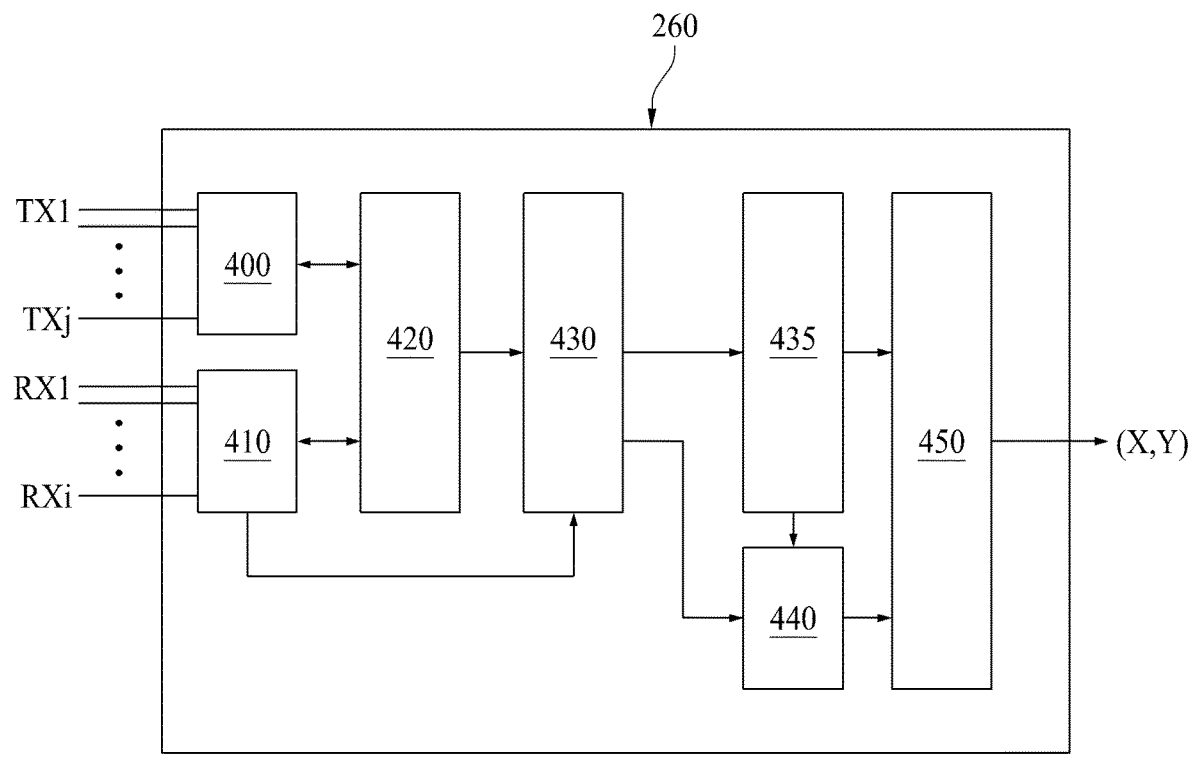
FIG. 4 is a schematic block diagram illustrating a configuration of the touch sensing device illustrated in FIGS. 2, 3A, and 3B.

FIG. 4 is a schematic block diagram illustrating the configuration of the touch sensing device according to one embodiment of the present disclosure. As illustrated in FIG. 4, the touch sensing device 260 according to one embodiment of the present disclosure includes a touch driving unit 400, a touch sensing unit 410, a touch controller 420, a touch coordinate calculation unit 430, a reference coordinate setting unit 435, and a touch coordinate correction unit 440. In addition, the touch sensing device may further include a touch output-coordinate transmission unit 450. The touch driving unit 400, the touch sensing unit 410, the touch controller 420, the touch coordinate calculation unit 430, the reference coordinate setting unit 435, the touch coordinate correction unit 440, and the touch output-coordinate transmission unit 450 may be integrated into one read-out IC (ROIC).

The touch driving unit 400 selects a touch driving channel through which a touch driving pulse is output under the control of the touch controller 420 and supplies the touch driving pulse to the touch driving lines TX1 to TXj connected to the selected touch driving channel.

The touch sensing unit 410 selects a touch sensing channel through which the voltages of the touch electrodes are received under the control of the touch controller 420 and receives the voltages of the touch electrodes through the touch sensing lines RX1 to RXj connected to the selected touch sensing channel. The touch sensing unit 410 samples the voltages of the touch electrodes received through the touch sensing lines RX1 to RXi and accumulates the sampled voltages in an integrator (not shown). The touch sensing unit 410 converts the voltages accumulated in the integrator into touch raw data TRD, which is digital data, by inputting the accumulated voltages to an analog-to-digital converter (ADC) (not shown) and then outputs the touch raw data TRD.

The touch controller 420 generates a touch driving setup signal for setting the touch driving channel, through which the touch driving pulse is to be output from the touch driving unit 400, and generates a touch sensing setup signal for setting the touch sensing channel through which the voltages of the touch electrodes are to be received by the touch sensing unit 410. In addition, the touch controller 420 generates timing control signals for controlling an operation timing of each of the touch driving unit 400 and the touch sensing unit 410.

The touch coordinate calculation unit 430 calculates the touch coordinate on the basis of the touch raw data TRD input from the touch sensing unit 410. In one embodiment, the touch coordinate calculation unit 430 may calculate the touch coordinate on the basis of a touch intensity defined by a difference between the touch raw data and reference data. In this case, the reference data may be set as an average value of the touch raw data obtained from n frames after the display system 200 is turned on.

In one embodiment, the touch coordinate calculation unit 430 may calculate the touch coordinate for each touch label composed of touch electrodes having touch intensities, each of which is calculated for each of the touch electrodes within one frame and is greater than or equal to a predetermined label threshold. According to the embodiment, the touch coordinate calculation unit 430 may calculate the touch coordinate using Equations 1 and 2 below, $$X = \frac{\sum_{n=1}^{N} X_n W_n}{\sum_{n=1}^{N} W_n}$$ [Equation 1]

$$Y = \frac{\sum_{n=1}^{N} Y_n W_n}{\sum_{n=1}^{N} W_n}$$ [Equation 2]

where X denotes an X-coordinate value of the touch coordinate, Y denotes a Y-coordinate value of the touch coordinate, $X_n$ denotes an X-coordinate value of an nth touch electrode included in a specific touch label, $Y_n$ denotes a Y-coordinate value of the nth touch electrode included in the corresponding touch label, and $W_n$ denotes a touch intensity of the nth touch electrode included in the corresponding touch label.

Figure 5:
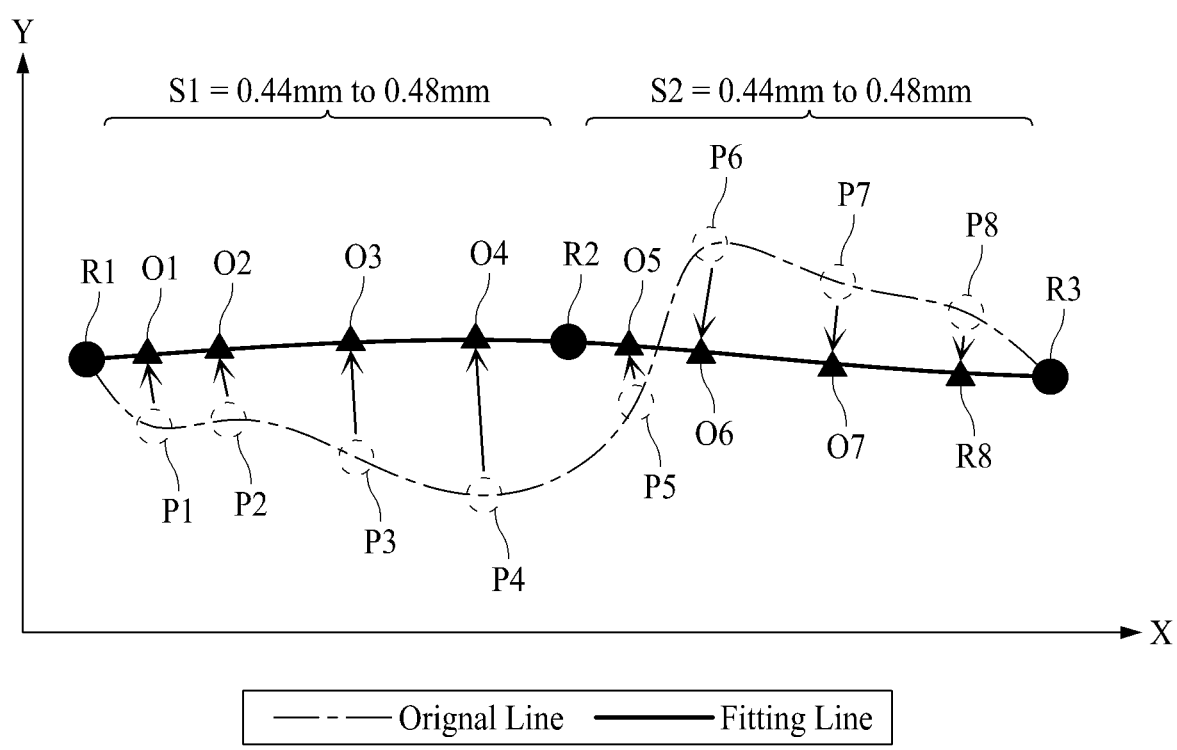
FIG. 5 is a conceptual view illustrating an example of correcting a touch-drawing line, which is generated by a slow touch, using a correction method according to the present disclosure.

The reference coordinate setting unit 435 sets one reference coordinate each predetermined sample section on the basis of positions at which the touch coordinates calculated by the touch coordinate calculation unit 430 are generated. As an example, as illustrated in FIG. 5, when the reference coordinate setting unit 435 sets a touch coordinate positioned at a first point on the touch screen panel as a first reference coordinate R1, the reference coordinate setting unit 435 may set a touch coordinate positioned at a second point, which is spaced apart from the first reference coordinate R1 by a first sample section S1, as a second reference coordinate R2. Here, the first reference coordinate may be determined as a touch coordinate that is calculated first by the touch coordinate calculation unit 430.

Similarly, the reference coordinate setting unit 435 may set a touch coordinate positioned at a third point, which is at a distance spaced apart from the second reference coordinate R2 by a second sample section S2, as a third reference coordinate R3.

In one embodiment, a length of each sample section may be set to be in a range of 0.44 mm to 0.48 mm. This is because when the length of each sample section is set to be greater than 0.48 mm, the smoothness of the drawing line may be improved, but touch latency as well as distortion in a curved portion becomes severe, and when the length of each sample section is set to be less than 0.44 mm, the touch latency of the drawing line and the distortion in the curved portion may be improved, but the smoothness of the drawing line may be degraded.

As described above, the reason for setting one reference coordinate for each sample section through the reference coordinate setting unit 435 in the present disclosure is to perform the smoothing using the reference coordinate for each sample section. In more detail, in the case of a conventional smoothing algorithm in which a touch coordinate of a previous time point is used to correct a touch coordinate of a current time point, as smoothing becomes stronger, the smoothness of a drawing line is improved, but there is a problem in that distortion in a curved portion becomes severe. Further, as the smoothing becomes weaker, the distortion in the curved portion is reduced, but there is a problem in that the smoothness of the drawing line is reduced.

However, in the case of the present disclosure, sample sections are set, and the smoothing is applied to touch coordinates included in the corresponding sample section using one common reference coordinate set for corresponding sample section by each sample section so that the drawing line may be expressed similar to a straight line as much as possible while satisfying the predetermined touch latency, thereby improving the smoothness of the entire drawing line and reducing the distortion of the curved portion.

Referring to FIG. 4 again, the touch coordinate correction unit 440 corrects the touch coordinates positioned in each sample section by smoothing the touch coordinates on the basis of the reference coordinate set for each sample section, thereby generating touch output-coordinates.

In one embodiment, the touch coordinate correction unit 440 may correct the touch coordinates included in the corresponding sample section by summing a value obtained by multiplying the reference coordinate set for each sample section by a first weight and a value obtained by multiplying each of the touch coordinates included in each sample section by a second weight.

In more detail, the touch coordinate correction unit 440 may correct one or more touch coordinates included in the corresponding sample section for each sample section using Equations 3 and 4 below, $$X_{nO} = W_1 X_{R1} + W_2 X_{n1} \quad \text{[Equation 3]}$$

$$Y_{nO} = W_1 Y_{R1} + W_2 Y_{n1} \quad \text{[Equation 4]}$$

where in Equation 3, $X_{R1}$ denotes an X-coordinate value of a first reference coordinate set for a first sample section, $X_{n1}$ denotes an X-coordinate value of an nth first touch coordinate included in the first sample section, $X_{nO}$ denotes an X-coordinate value of an nth first touch output-coordinate generated by correcting the nth first touch coordinate, $W_1$ denotes a first weight, and $W_2$ denotes a second weight.

Further, in Equation 4, $Y_{R1}$ denotes a Y-coordinate value of the first reference coordinate set for the first sample section, $Y_{n1}$ denotes a Y-coordinate value of the nth first touch coordinate included in the first sample section, $Y_{nO}$ denotes a Y-coordinate value of the nth first touch output-coordinate generated by correcting the nth first touch coordinate, $W_1$ denotes the first weight, and $W_2$ denotes the second weight.

As an example, as illustrated in FIG. 5, the touch coordinate correction unit 440 corrects one or more first touch coordinates P1, P2, P3, and P4 positioned in the first sample section S1 by applying the smoothing to each of the first touch coordinates P1, P2, P3, and P4 on the basis of the first reference coordinate R1 of the first sample section S1 according to Equations 1 and 2 described above, thereby generating each of first touch output-coordinates O1, O2, O3, and O4. Here, in the case of the first reference coordinate R1, the first reference coordinate R1 is set as a final touch output-coordinate without a separate correction operation.

Further, the touch coordinate correction unit 440 corrects one or more second touch coordinates P5, P6, P7, and P8 positioned in the second sample section S2 after the first sample section S1 by applying smoothing to each of second touch coordinates P5, P6, P7, and P8 on the basis of the second reference coordinate R2 of the second sample section S2 according to Equations 1 and 2 described above, thereby generating second touch output-coordinates O5, O6, O7, and O8. Here, in the case of the second reference coordinate R2, the second reference coordinate R2 is set as a final touch output-coordinate without a separate correction operation.

In the above-described embodiment, the touch coordinate correction unit 440 may determine the first weight such that the sum of the first weight to be applied to the reference coordinate and the second weight to be applied to the touch coordinates in each sample section is one, and the touch coordinate correction unit 440 may determine the first weight as a value that is inversely proportional to the degree of the touch latency (d) of the drawing line. As described above, according to the present disclosure, the touch coordinate correction unit 440 may improve the smoothness of the drawing line and reduce the distortion in the curved portion while adjusting the touch latency to an appropriate level through the adjustment of the first weight.

The touch coordinate calculation unit 430, the reference coordinate setting unit 435, and the touch coordinate correction unit 440, which are described above, may be implemented as a microcontroller unit (MCU).

Referring to FIG. 4 again, the touch output-coordinate transmission unit 450 transmits the reference coordinate set by the reference coordinate setting unit 435 and the touch output-coordinates generated by the touch coordinate correction unit 440 to the host system 250 according to a predetermined touch coordinate transmission frequency. In one embodiment, the transmission frequency of the reference coordinate and the touch output-coordinates may be changed on the basis of a touch speed of the drawing line or the like.

The reference coordinate and the touch output-coordinates transmitted to the host system 250 are output on the display panel 210 according to an order in which the touch coordinates corresponding to the reference coordinate and the touch output-coordinates are generated, thereby being drawn into one line.

In FIG. 4, the touch output-coordinate transmission unit 450 is illustrated as being necessarily included in the touch sensing device 260, but this is merely one example, and the touch output-coordinate transmission unit 450 may be selectively included in the touch sensing device 260 in the modified embodiment.

Figure 6:
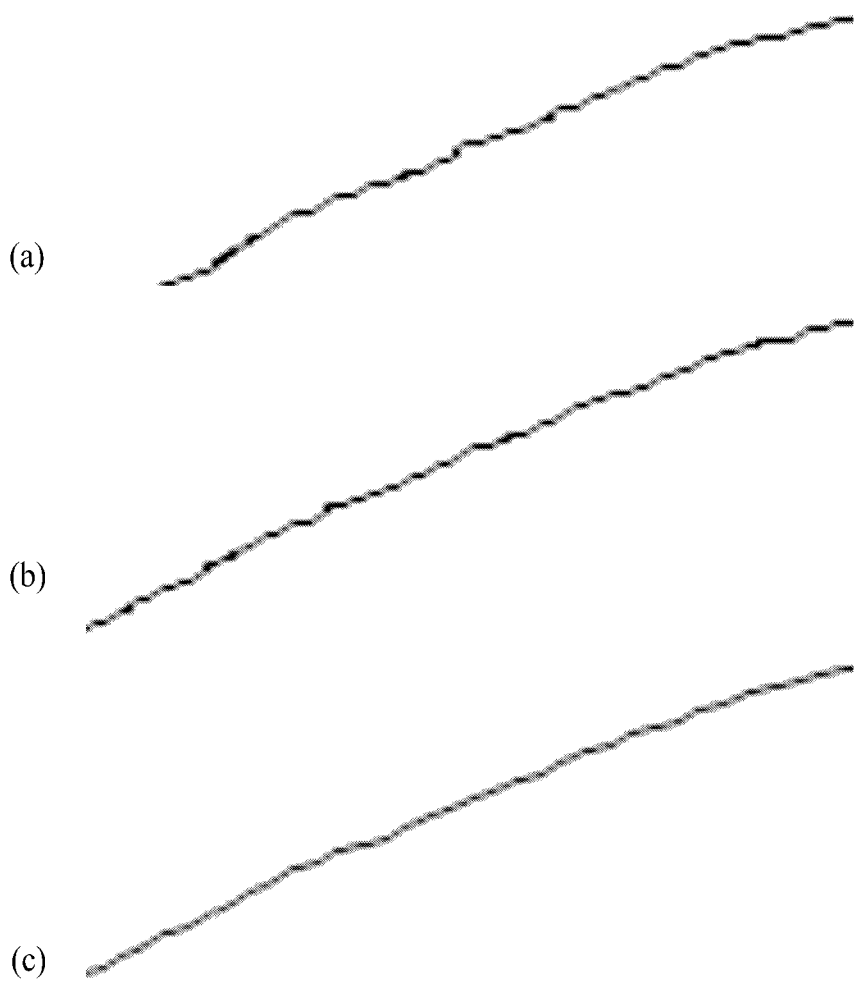
FIGS. 6A, 6B and 6C are a set of views illustrating a comparison between a result of strictly applying a smoothing algorithm to a touch-drawing line in a straight-line shape, a result of weakly applying the smoothing algorithm to the touch-drawing line, and a result of applying an algorithm according to the present disclosure to the touch-drawing line.
Figure 7:
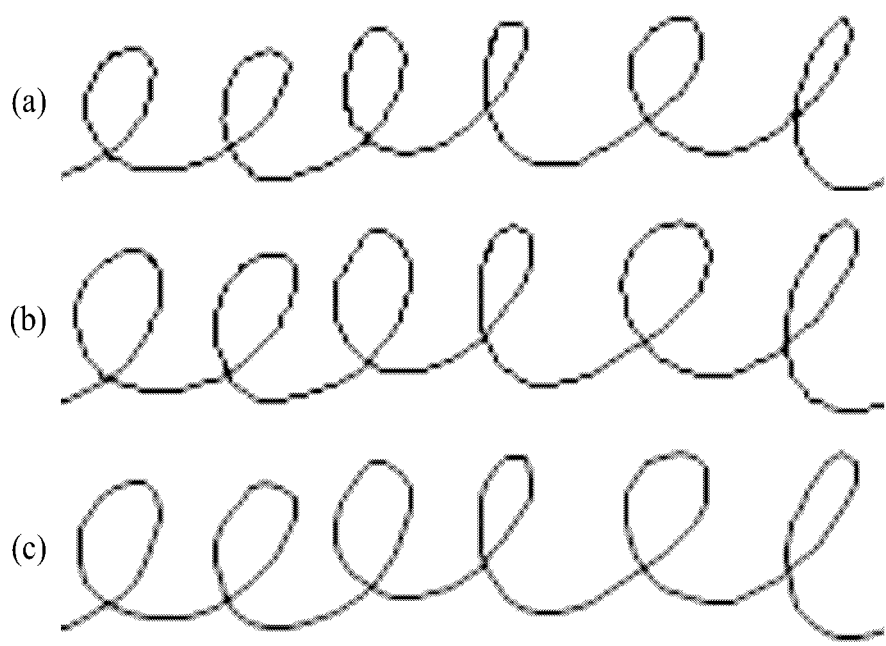
FIGS. 7A, 7B and 7C are a set of views illustrating a comparison between a result of strictly applying the smoothing algorithm to a touch-drawing line in a curved-line shape, a result of weakly applying the smoothing algorithm to the touch-drawing line, and a result of applying the algorithm according to the present disclosure to the touch-drawing line.
Figure 8:
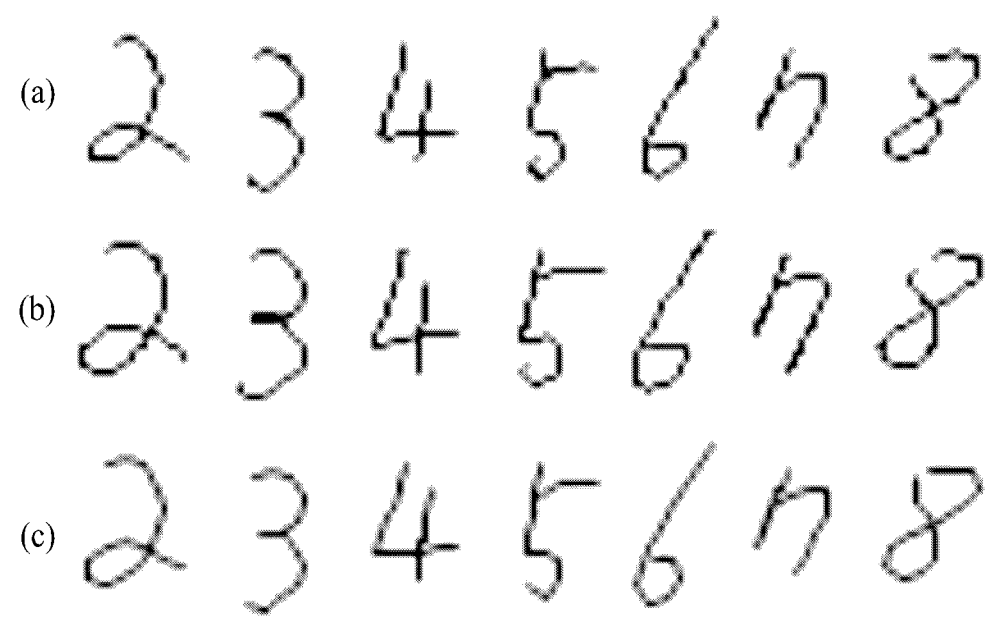

Examples in which drawing lines corrected by using a general smoothing method and drawing lines corrected according to the present disclosure are compared are illustrated in FIGS. 6 to 8. FIG. 6 is a set of views illustrating a comparison result of applying each method when the drawing line is a slow-drawn straight line. It can be seen that the degree of the smoothness and distortion is similar in a case in which strong smoothing is applied as illustrated in FIG. 6A and in a case in which weak smoothing is applied as illustrated in FIG. 6B, but when the correction method according to the present disclosure is applied as illustrated in FIG. 6C, both of the smoothness and distortion of the drawing line are improved as compared to those illustrated in FIGS. 6A and 6B.

FIG. 7 is a set of views illustrating a comparison result of applying each method when the drawing line is a curved line. It can be seen that when the strong smoothing is applied as illustrated in FIG. 7A, distortion in the drawing line is severe, and when the weak smoothing is applied as illustrated in FIG. 7B, the smoothness of the drawing line is degraded. On the contrary, it can be seen that, when the correction method according to the present disclosure is applied as illustrated in FIG. 7C, the distortion of the drawing line is improved as compared to the result of applying the strong smoothing, which is illustrated in FIG. 7A, and the smoothness of the drawing line is further improved as compared to both of the result of applying the strong smoothing, which is illustrated in FIG. 7A, and the result of applying the weak smoothing, which is illustrated in FIG. 7B.

FIG. 8 is a set of views illustrating a comparison result of applying each method when the drawing line is in a numeric shape. Similar to the example illustrated in FIG. 7, it can be seen that, when the correction method according to the present disclosure is applied as illustrated in FIG. 8C, the distortion of the drawing line is improved as compared to the result of applying the strong smoothing, which is illustrated in FIG. 8A, and the smoothness of the drawing line is further improved as compared to both of the result of applying the strong smoothing, which is illustrated in FIG. 8A, and the result of applying the weak smoothing, which is illustrated in FIG. 8B.

Figure 9:
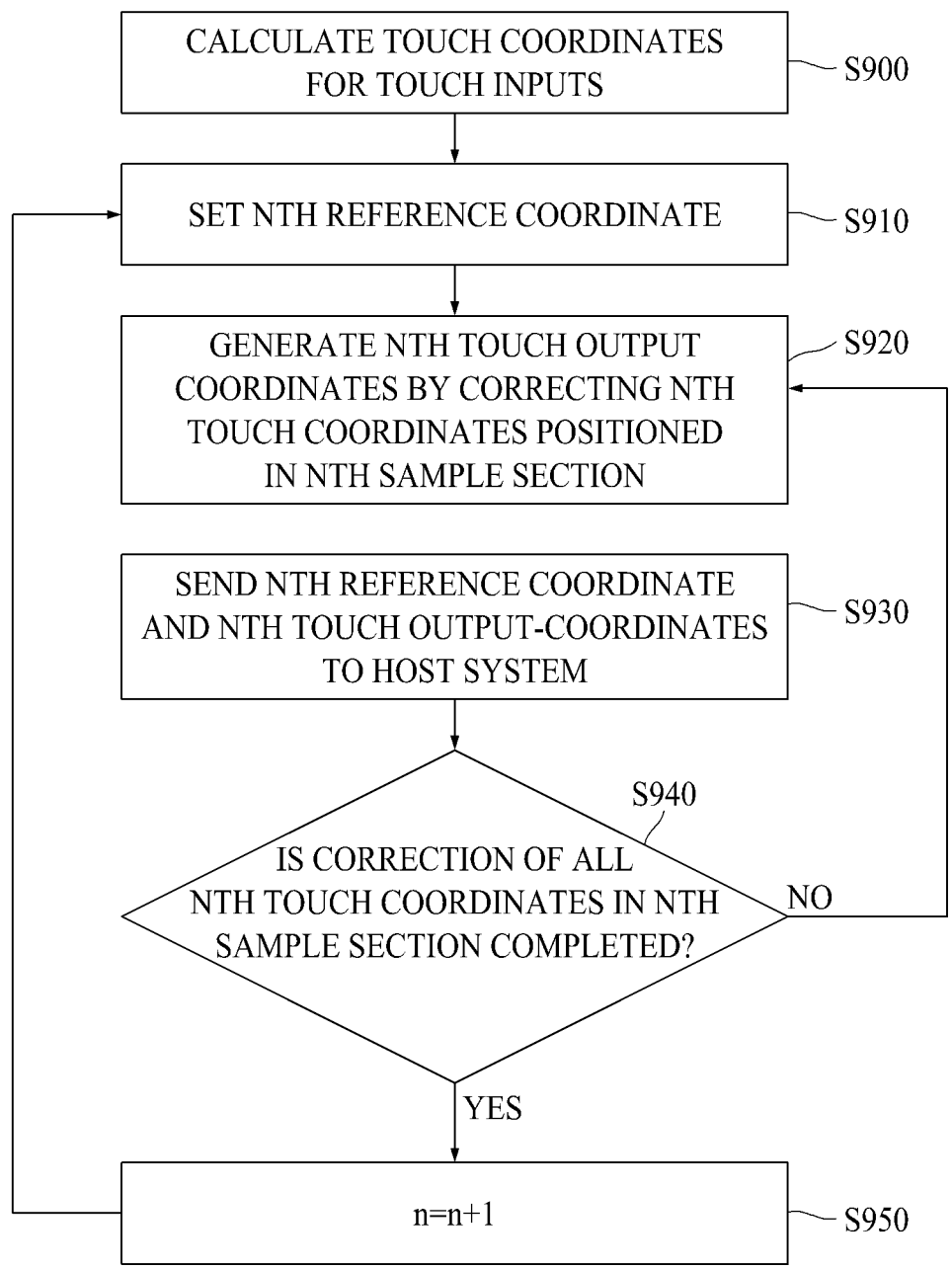
FIG. 9 is a flowchart illustrating a touch sensing method for fitting a drawing line according to one embodiment of the present disclosure.

Hereinafter, a touch sensing method for fitting a drawing line according to the present disclosure will be described with reference to FIG. 9. FIG. 9 is a flowchart illustrating a touch sensing method for fitting a drawing line according to one embodiment of the present disclosure. The touch sensing method illustrated in FIG. 9 may be performed by the touch sensing device illustrated in FIG. 4.

First, a touch sensing device calculates touch coordinates for touch inputs generated on a touch screen panel (S900). In one embodiment, the touch sensing device may calculate the touch coordinate on the basis of a touch intensity defined by a difference between touch raw data and reference data. In more detail, the touch sensing device may compose a touch label with touch electrodes having touch intensities, each of which is calculated for each of the touch electrodes within one frame and is greater than or equal to a predetermined label threshold, and may calculate the touch coordinate for each touch label.

Thereafter, the touch sensing device sets an nth reference coordinate (where n is a natural number greater than or equal to one) (S910). As an example, the touch sensing device may set a first touch coordinate calculated in the operation S900 as a first reference coordinate.

After the setting of the nth reference coordinate is completed, the touch sensing device corrects nth touch coordinates, which are positioned in a predetermined nth sample section that starts from the nth reference coordinate, to generate nth touch output-coordinates (S920). That is, in the present disclosure, one reference coordinate is set for each sample section, and the touch coordinates positioned in each sample section are corrected by using the reference coordinate set for the corresponding sample section.

In the present disclosure, the reason that the touch sensing device sets one reference coordinate for each sample section is to perform smoothing for each sample section using the reference coordinate set for the corresponding sample section. In more detail, in the case of a conventional smoothing algorithm in which a touch coordinate of a previous time point is used to correct a touch coordinate of a current time point, as smoothing becomes stronger, the smoothness of a drawing line is improved, but there is a problem in that distortion in a curved portion becomes severe. Further, as the smoothing becomes weaker, the distortion in the curved portion is reduced, but there is a problem in that the smoothness of the drawing line is reduced.

However, in the case of the present disclosure, sample sections are set, and the smoothing is applied to touch coordinates included in the corresponding sample section using one common reference coordinate set for corresponding sample section by each sample section so that the drawing line may be expressed similar to a straight line as much as possible while satisfying the predetermined touch latency, thereby improving the smoothness of the entire drawing line and reducing the distortion of the curved portion.

In more detail, the touch sensing device may correct the nth touch coordinates by applying a smoothing algorithm on the basis of the nth reference coordinate for each of the nth touch coordinates positioned in the nth sample section. Here, the touch sensing device may calculate an X-coordinate value of each of the nth touch output-coordinates by summing a resultant value obtained by multiplying an X-coordinate value of the nth reference coordinate by a first weight and a resultant value obtained by multiplying an X-coordinate value of each of the nth touch coordinates by a second weight.

Similarly, the touch sensing device may calculate a Y-coordinate value of each of the nth touch output-coordinates by summing a resultant value obtained by multiplying a Y-coordinate value of the nth reference coordinate by the first weight and a resultant value obtained by multiplying a Y-coordinate value of each of the nth touch coordinates by the second weight.

In the above-described embodiment, the first weight may be determined to be a value that is inversely proportional to the degree of touch latency of the drawing line within a range in which the sum of the first weight and the second weight is one. As described above, according to the present disclosure, the touch sensing device may improve the smoothness of the drawing line and reduce the distortion in the curved portion while adjusting the touch latency to an appropriate level through the adjustment of the first weight to be multiplied by the reference coordinate.

In the above-described embodiment, a length of the nth sample section may be set to be in a range of 0.44 mm to 0.48 mm. This is because when the length of each sample section is set to be greater than 0.48 mm, the smoothness of the drawing line may be improved, but touch latency as well as distortion in the curved portion becomes severe, and when the length of each sample section is set to be less than 0.44 mm, the touch latency of the drawing line and the distortion in the curved portion may be improved, but the smoothness of the drawing line may be degraded.

Afterward, the touch sensing device may transmit the nth reference coordinate and the nth touch output-coordinates to a host system (S930). The nth reference coordinate and the nth touch output-coordinates transmitted to the host system may be sequentially displayed as one line on a display panel according to a generation order of the touch coordinates corresponding to the nth reference coordinate and the nth touch output-coordinates. It is illustrated in FIG. 9 that the operation of transmitting the nth reference coordinate and the nth touch output-coordinates to the host system by the touch sensing device is necessarily included, but this is merely one example, and the operation of transmitting the nth reference coordinate and the nth touch output-coordinates to the host system may be selectively performed.

Thereafter, the touch sensing device determines whether the correction of all the nth touch coordinates positioned in the nth sample section has been completed (S940). In one embodiment, when a new touch coordinate is calculated at a point after the nth sample section from the nth reference coordinate, the touch sensing device may determine that the correction of all the nth touch coordinates positioned in the nth sample section has been completed.

When it is determined that the correction of all the nth touch coordinates positioned in the nth sample section is completed as a result of the determination, the touch sensing device increases n by one (S950) and then returns to the operation S910 and repeats the subsequent operations. Here, in the operation S910, a (n+1)th reference coordinate may be set as a touch coordinate generated first at a point after the nth sample section.

On the other hand, in the operation S940, when it is determined that the correction of all the nth touch coordinates in the nth sample section is not completed, the touch sensing device returns to the operation S920 and repeats the operations S920 and S930 until the correction of all the nth touch coordinates included in the nth sample section is completed.

It should be understood by those skilled in the art that the present disclosure can be embodied in other specific forms without changing the technical concept and essential features of the present disclosure.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

According to the present disclosure, a reference coordinate is set for each predetermined sample section, and a smoothing algorithm is applied to one or more touch coordinates included in the corresponding sample section on the basis of the reference coordinate of each sample section so that there is an effect that the reduction in the distortion of a touch-drawing line and the improvement in the smoothness of the touch-drawing line can be simultaneously satisfied within a range that satisfies certain touch latency.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A touch sensing device for fitting a drawing line, the touch sensing device comprising:
a touch coordinate calculation unit configured to calculate touch coordinates for touch inputs that occurred on a touch screen panel;
a reference coordinate setting unit configured to set one reference coordinate for each predetermined sample section on a basis of spaced apart positions at which the touch coordinates are generated; and
a touch coordinate correction unit configured to generate touch output-coordinates for the touch coordinates corresponding to the spaced apart positions by smoothing each of the touch coordinates positioned in a corresponding sample section on a basis of the reference coordinate set for the corresponding sample section,
wherein the touch coordinate correction unit is configured to generate each of the touch output-coordinates corresponding to the spaced apart positions by summing a value obtained by multiplying the reference coordinate by a first weight and a value obtained by multiplying a corresponding one of the touch coordinates by a second weight.

2. The touch sensing device of claim 1, wherein a length of the predetermined sample section is set to be in a range of 0.44 mm to 0.48 mm.

3. The touch sensing device of claim 1, wherein the touch coordinate correction unit determines the first weight as a value that is inversely proportional to a degree of touch latency of the drawing line within a range in which a sum of the first weight and the second weight is equal to one.

4. The touch sensing device of claim 1, wherein: the reference coordinate setting unit sets a touch coordinate positioned at a first point as a first reference coordinate and sets a touch coordinate positioned at a second point, which is spaced apart from the first reference coordinate by a first sample section, as a second reference coordinate; and
the touch coordinate correction unit generates first touch output-coordinates by smoothing each of first touch coordinates positioned in the first sample section on a basis of the first reference coordinate and generates second touch output-coordinates by smoothing each of second touch coordinates, which are positioned in a second sample section that starts from the second reference coordinate, on a basis of the second reference coordinate.

5. The touch sensing device of claim 1, wherein the reference coordinate and the touch output-coordinates are output on a display panel including the touch screen panel according to a generation order, thereby being drawn into one line.

6. The touch sensing device of claim 1, further comprising a touch output-coordinate transmission unit configured to transmit the reference coordinate and the touch output-coordinates to a host system.

7. A touch sensing method for fitting a drawing line, the method comprising:
setting a touch coordinate positioned at a first point on a touch screen panel as a first reference coordinate; and
generating first touch output-coordinates for first touch coordinates corresponding to spaced apart touch inputs by smoothing each of the first touch coordinates, which are positioned in a first sample section that starts from the first reference coordinate on the touch screen panel, on a basis of the first reference coordinate,
wherein, in the generating of the first touch output-coordinates, each of the first touch output-coordinates corresponding to the spaced apart positions is generated by summing a value obtained by multiplying the first reference coordinate by a first weight and a value obtained by multiplying a corresponding one of the first touch coordinates by a second weight.

8. The touch sensing method of claim 7, wherein a length of the first sample section is set to be in a range of 0.44 mm to 0.48 mm.

9. The touch sensing method of claim 7, wherein the first weight is determined as a value that is inversely proportional to a degree of touch latency of the drawing line within a range in which a sum of the first weight and the second weight is equal to one.

10. The touch sensing method of claim 7, further comprising displaying a drawing line by outputting the first reference coordinate and the first touch output-coordinates on a display panel including the touch screen panel according to a generation order.

11. The touch sensing method of claim 7, further comprising:
setting a touch coordinate, which is positioned at a second point spaced apart from the first reference coordinate by the first sample section, as a second reference coordinate; and
generating second touch output-coordinates for second touch coordinates by smoothing each of the second touch coordinates, which are positioned in a second sample section that starts from the second reference coordinate on the touch screen panel, on a basis of the second reference coordinate.

12. The touch sensing method of claim 11, further comprising displaying a drawing line by outputting the first reference coordinate, the first touch output-coordinates, the second reference coordinate, and the second touch output-coordinates according to a generation order.

* * * * *